(12) United States Patent
Odjo et al.

(10) Patent No.: US 12,595,427 B2
(45) Date of Patent: Apr. 7, 2026

(54) COMMERCIAL GRADE ULTRA-LOW SULPHUR DIESEL PRODUCTION PROCESS FROM MIXED WASTE PLASTICS PYROLYSIS OIL

(71) Applicant: Clean Planet Energy, London (GB)

(72) Inventors: Andrew Odjo, London (GB); Bertie Stephens, London (GB)

(73) Assignee: Clean Planet Energy, A Trading Name of Pyroplast Energy LTD, London (GB)

(*) Notice: Subject to any disclaimer, the term of this patent is extended or adjusted under 35 U.S.C. 154(b) by 15 days.

(21) Appl. No.: 18/020,380

(22) PCT Filed: Jul. 27, 2021

(86) PCT No.: PCT/GB2021/051924
§ 371 (c)(1),
(2) Date: Feb. 8, 2023

(87) PCT Pub. No.: WO2022/034287
PCT Pub. Date: Feb. 17, 2022

(65) Prior Publication Data
US 2023/0348799 A1 Nov. 2, 2023

(30) Foreign Application Priority Data

Aug. 14, 2020 (GB) .................................... 2012708

(51) Int. Cl.
*C10G 49/26* (2006.01)
*B01D 3/14* (2006.01)
*B01D 5/00* (2006.01)

(52) U.S. Cl.
CPC .............. *C10G 49/26* (2013.01); *B01D 3/14* (2013.01); *B01D 5/0036* (2013.01); *B01D 5/009* (2013.01); *C10G 2300/202* (2013.01); *C10G 2300/42* (2013.01); *C10G 2400/04* (2013.01)

(58) Field of Classification Search
CPC .............. C10G 49/26; C10G 2300/202; C10G 2400/04
See application file for complete search history.

(56) References Cited

U.S. PATENT DOCUMENTS 5,608,136 A * 3/1997 Maezawa ................. C10G 1/10
588/317
2012/0149954 A1 6/2012 Fraczak et al.

2012/0310023 A1 12/2012 Huang et al.
2018/0187087 A1 * 7/2018 Atkins .................... C10G 45/60
2021/0269721 A1 * 9/2021 Farei ..................... C10G 45/00
2023/0250343 A1 * 8/2023 Wang ..................... C10G 31/09
585/241

FOREIGN PATENT DOCUMENTS

| CN | 101724426 | 6/2010 |
|----|-----------|--------|
| CN | 102942951 | 2/2013 |
| CN | 104611060 | 5/2015 |
| JP | 2001019973 | 1/2001 |

OTHER PUBLICATIONS

S. Bezergianni et al., Alternative Diesel From Waste Plastics, 10 Energies 1750 (2017).*
C. Likkasit et al., Solar-Aided Hydrogen Production Methods for the Integration of Renewable Energies Into Oil & Gas Industries, 168 Energy Conserv. Manag. 395-406 (2018).*
Bezergianni et al., "*Alternative Diesel From Waste Plastics*", 2017, Energies, vol. 10, No. 11, p. 1750.
Krzywda et al., "*Simulation of the Condensation and Fractionation Unit in Waste Plastics Pyrolysis Plant*," Waste and Biomass Valorization, 2020, vol. 12, No. 1, pp. 91-104.

* cited by examiner

*Primary Examiner* — Randy Boyer
(74) *Attorney, Agent, or Firm* — Womble Bond Dickinson (US) LLP

(57) ABSTRACT

The present invention provides a method of upgrading mixed waste plastic pyrolysis oil comprising the steps of providing a pyrolysis oil stream derived from mixed waste plastic, subjecting the pyrolysis oil stream to fractional condensation to obtain three pyrolysis oil fractions, determining properties of the pyrolysis oil fractions, determining an adjusted proportion of the pyrolysis oil fractions to be fed to a hydro-upgrading section for obtaining a product with a predetermined product specification, feeding the pyrolysis oil fractions in the adjusted proportion to a pyrolysis oil hydro-upgrading section to perform a hydro-upgrading operation, adjusting one or more control parameters of the pyrolysis oil hydro-upgrading section according to the adjusted proportion of the pyrolysis oil fractions and the predetermined product specification; and separating an hydro-upgrading section outlet stream to obtain a product stream with the predetermined product specification. In this way, the upgrading of the pyrolysis oil can be tailored and adapted to the great variability of properties of pyrolysis oil derived from mixed plastic waste pyrolysis in order to obtain a uniform commercial-grade fuel that can achieve a premium market value. The process may comprise in-situ hydrogen generation by water electrolysis powered by solar photovoltaic energy.

15 Claims, 2 Drawing Sheets

COMMERCIAL GRADE ULTRA-LOW SULPHUR DIESEL PRODUCTION PROCESS FROM MIXED WASTE PLASTICS PYROLYSIS OIL

CROSS-REFERENCE TO RELATED APPLICATIONS

The present application is a U.S. National Stage of International Patent Application PCT/GB2021/051924, filed Jul. 27, 2021, and claims priority to Great Britain Patent Application No. 2012708.0, filed Aug. 14, 2020, granted on Aug. 31, 2022 as GB2590525B. The disclosures of each of the applications noted above are incorporated herein by reference in their entirety.

TECHNICAL FIELD OF THE INVENTION

The present invention belongs to the general technical field of chemical engineering, more particularly to the technical field of mixed waste plastic recycling by pyrolysis to produce commercial grade fuels by upgrading the pyrolysis oil using conventional oil refining technologies.

BACKGROUND TO THE INVENTION

Plastic waste is nowadays a major environmental problem in developed societies. Plastic waste occupies a large volume in landfills due to its low bulk density. Landfill space is increasingly scarcer in developed countries and therefore the amount of plastic waste to be deposited in landfills needs to be minimised. Mixed plastic waste, as it is recovered from domestic refuse sorting, is difficult to reuse or recycle because of the diversity of plastics it contains and the level of impurities present in it. There are limited options to deal with mixed plastic waste, including export to third countries or its transformation into fuel by pyrolysis.

Third countries are increasingly reluctant to accept plastic waste from developed countries, and therefore, the option of converting mixed waste plastic into fuels becomes not only a need but it could also be an opportunity to reduce our reliance in crude oil derived fuels, at the same time as reducing waste plastic pollution in worldwide habitats, such as our oceans.

Currently there are some operators that recycle mixed waste plastic by pyrolysis to produce pyrolysis oil derived thereof and sell it as it comes directly from the pyrolysis unit with little or no post-processing. Raw or unprocessed pyrolysis oil derived from waste plastic presents a number of problems or disadvantages:

It is a low quality fuel compared to commercial grade fuels in terms of ignition properties, pour point, viscosity and density.

It is an unclean or dirty fuel because it contains significant amounts of sulphur, nitrogen, halogens and metals derived from plastic additives and therefore it does not comply with many commercial-grade fuel regulations.

It is very unstable due to its high oxygenates content.

It is highly olefinic or unsaturated, which reduces its ability to be stored for long periods of time.

Its properties are highly variable as they are too dependent on the composition of the mixed plastic waste.

All of the above drawbacks make waste plastic derived pyrolysis oil a low market value fuel, which in turn, makes mixed waste plastic recycling an unattractive process for investors to fund and therefore, the mixed plastic waste problem remains unsolved in a scenario of highest ever necessity for it to be addressed, due to the continually increasing volumes of waste plastic generated and the currently decreasing options for its export.

SUMMARY OF THE INVENTION

A first aspect of the invention provides a method of upgrading mixed waste plastic pyrolysis oil comprising the steps of:

providing a pyrolysis oil stream derived from mixed waste plastic pyrolysis;

subjecting the pyrolysis oil stream to a three-step fractional condensation to obtain a heavy pyrolysis oil fraction, a middle pyrolysis oil fraction and a light pyrolysis oil fraction;

acquiring one or more properties of a diesel product stream;

determining an adjusted proportion of the heavy pyrolysis oil fraction, the middle pyrolysis oil fraction and/or the light pyrolysis oil fraction to be fed to each unit of a pyrolysis oil hydro-upgrading section for obtaining a diesel product stream with one or more properties as close as possible to a predetermined diesel product specification, feeding the heavy pyrolysis oil fraction, the middle pyrolysis oil fraction and/or the light pyrolysis oil fraction in the adjusted proportion to each unit of a pyrolysis oil hydro-upgrading section to perform a hydro-upgrading operation;

adjusting one or more control parameters of each unit of the pyrolysis oil hydro-upgrading section according to the adjusted proportions of the heavy pyrolysis oil fraction, the middle pyrolysis oil fraction and/or the light pyrolysis oil fraction to be fed to each unit of the hydro-upgrading section, the acquired one or more properties of the diesel product stream and the predetermined diesel product specification; and separating a hydro-upgrading section outlet stream to obtain the diesel product stream with one or more properties as close as possible to the predetermined product specification.

One of the most important benefits of the process of upgrading mixed waste plastic pyrolysis oil described above is that it eliminates the great variability in properties of pyrolysis oil to obtain a fuel with more consistent properties, thus increasing its market value.

Another important advantage is that in produces a product stream that is a fuel with very low amounts of sulphur, nitrogen, halogen, unsaturations (double-bonds) and oxygenates, thus making it a commercial-grade fuel product with a high-market value as it is able to comply with commercial grade fuel regulations and to be sold at a premium price due to its ultraclean burning.

The pyrolysis oil hydro-upgrading operation has the effects of olefin saturation, hydrodesulfuration, hydrodenitrification, hydrodeoxygentation, hydrodemetalation or hydrodemetalisation, hydrodearomatisation, decyclisation and cracking and isomerisation to varying degrees, depending on the severity of the treatments.

Another advantage is that the product stream is a better fuel than pyrolysis oil in terms of pour point, lubricity, ignition parameters, etc. and therefore, this also enables to obtain a premium price for it.

All these advantages will add together to make the option of mixed waste plastic recycling an attractive investment, therefore, producing a worldwide adoption of this recycling technology which would imply a drastic global reduction in plastic waste pollution.

The three-step fractional condensation of the pyrolysis oil stream may comprise a first condensation at a temperature between 320 to 340° C. to separate the heavy pyrolysis oil fraction.

The three-step fractional condensation of the pyrolysis oil stream may comprise a second condensation at a temperature between 170 to 190° C. to separate the middle pyrolysis oil fraction.

The three-step fractional condensation of the pyrolysis oil stream may comprise a third condensation at a temperature between 40 to 60° C. to separate the light pyrolysis oil fraction and a gas fraction.

The gas fraction remaining after the third condensation may be used as a fuel for the hydro-upgrading section and/or for the separation.

Therefore, the heavy pyrolysis oil fraction may have a boiling point range of 600 to 320-340° C., the middle pyrolysis oil fraction may have a boiling point range of 320-341 to 170-190° C. and the light pyrolysis oil fraction may have a boiling point range of 170-190 to 40-60° C.

Acquiring one or more properties of the diesel product stream may comprise in-line or off-line data acquisition of properties like pressure, temperature, flow, PIONA analysis values, density, viscosity, corrosiveness, Bromine number, pour point, cloud point, cetane number, sulphur content and/or SARA numbers.

The method may comprise acquiring one or more properties of the heavy pyrolysis oil fraction, the middle pyrolysis oil fraction and/or the light pyrolysis oil fraction, respectively, and this may comprise in-line or off-line data acquisition of properties like pressure, temperature, flow, PIONA analysis values, density, viscosity, corrosiveness, Bromine number, pour point, cloud point, sulphur content, SARA numbers, etc. of each pyrolysis oil fraction.

The method may comprise the step of adjusting one or more control parameters of each unit of the pyrolysis oil hydro-upgrading section also according to the acquired one or more properties of the heavy pyrolysis oil fraction, the middle pyrolysis oil fraction and/or the light pyrolysis oil fraction.

The step of determining an adjusted proportion of the heavy pyrolysis oil fraction, the middle pyrolysis oil fraction and/or the light pyrolysis oil fraction to be fed to each unit of a pyrolysis oil hydro-upgrading section for obtaining a diesel product stream with one or more properties as close as possible to a predetermined diesel product specification may also take into account the acquired one or more properties of the heavy pyrolysis oil fraction, the middle pyrolysis oil fraction and/or the light pyrolysis oil fraction.

The pyrolysis oil hydro-upgrading operation may comprise hydrocracking and/or hydrotreating the heavy pyrolysis oil fraction, the middle pyrolysis oil fraction and/or the light pyrolysis oil fraction in different proportions and combinations.

Hydrocracking typically comprises subjecting the feed streams to high temperature (260-425° C.) and high pressure (35-200 bar) in a hydrogen-rich atmosphere in the presence of a suitable catalyst. Typically hydrocracking is performed in a catalytic reactor with a dual function under a high hydrogen partial pressure and elevated temperatures such that large hydrocarbon molecules crack into smaller molecules at the same time that double bonds are saturated and sulphur, nitrogen, oxygen and other heteroatoms, such as metals, are removed by the hydrogen from the hydrocarbon chains. At the same time, aromatic compounds are saturated into cyclic compounds and some additional branching may be produced.

Hydrotreating typically comprises subjecting the feed streams to high temperatures and pressures in a hydrogen-rich atmosphere in the presence of a suitable catalyst. Typically, hydrotreating is performed in a catalytic reactor with a Nickel-Molybdenum or Cobalt-Molybdenum catalyst under a high hydrogen partial pressure and high temperature such that double bonds are saturated and sulphur, nitrogen, oxygen and other heteroatoms, such as metals, are removed by the hydrogen from the hydrocarbon chains, without significant cracking. At the same time, aromatic compounds are saturated into cyclic compounds and some additional branching may be produced.

Optionally, the pyrolysis oil hydro-upgrading operation may comprise a hybrid fluid catalytic cracking of at least part of the heavy pyrolysis oil fraction. In this way it is possible to improve the diesel yield of the overall process by at least partially reducing the average molecular weight of the heavy pyrolysis oil fraction.

Determining an adjusted proportion of the heavy pyrolysis oil fraction, the middle pyrolysis oil fraction and/or the light pyrolysis oil fraction to be fed to a pyrolysis oil hydro-upgrading section for obtaining a product stream with a predetermined product specification, and adjusting one or more control parameters of the pyrolysis oil hydro-upgrading section according to the adjusted proportion of the heavy pyrolysis oil fraction, the middle pyrolysis oil fraction and the light pyrolysis oil fraction and the predetermined product specification may be carried out by a dynamic control system comprising a programmable processing unit.

The pyrolysis oil hydro-upgrading operation may comprise in-situ hydrogen generation by water electrolysis powered by solar energy. This feature helps increase the profitability margins of the operation by using a free source of energy. Besides, solar energy is a renewable source of energy and this reduces the environmental footprint of the process.

Separating a hydro-upgrading section outlet stream to obtain a product stream with the predetermined product specification may comprise fractional distillation of one or more hydro-upgrading section outlet streams. The fractional distillation is typically carried out in a distillation column, one of the outlet streams of which is the product stream.

According to a second aspect of the invention there is provided a mixed waste plastic recycling plant subsection for upgrading mixed waste plastic pyrolysis which comprises:

a mixed waste plastic pyrolysis oil feed stream;

three coolers connected in series for performing a three-step fractional condensation of the pyrolysis oil feed stream to obtain a heavy pyrolysis oil fraction, a middle pyrolysis oil fraction and a light pyrolysis oil fraction;

a pyrolysis oil hydro-upgrading section to perform a hydro-upgrading operation on at least one pyrolysis oil fraction or a combination thereof;

a separation unit for separating an hydro-upgrading section outlet stream to obtain a product stream; and a dynamic control system configured for acquiring one or more properties of the diesel product stream, determining an adjusted proportion of the heavy pyrolysis oil fraction, the middle pyrolysis oil fraction and the light pyrolysis oil fraction to be fed to each unit of a pyrolysis oil hydro-upgrading section for obtaining a diesel product stream with one or more properties as close as possible to a predetermined product specification, and for adjusting one or more control parameters of each unit of the pyrolysis oil hydro-upgrading section according to the adjusted proportions of the heavy pyrolysis oil fraction, the middle pyrolysis oil fraction and the light pyrolysis oil fraction to be fed to each unit of the hydro-upgrading section and the predetermined product specification.

The mixed waste plastic recycling plant subsection for upgrading mixed waste plastic pyrolysis described above is suitable for carrying out the method of upgrading mixed waste plastic pyrolysis oil described in the first aspect of invention in an economically viable way. It allows to obtain a commercial-grade fuel with the required properties uniformity to obtain a premium price in the market despite the high variability of the pyrolysis oil properties in the feed. This is due, in part, to the splitting of the pyrolysis oil stream in three fractions by fractional condensation in three coolers connected in series and the hydro-upgrading of a varying proportion of each of these fractions which allows to decouple the final product properties from the initial pyrolysis oil properties, thus allowing the operator to obtain a more uniform commercial-grade product.

Optionally, the dynamic control system may be configured to acquire or monitor one or more properties of the heavy pyrolysis oil fraction, the middle pyrolysis oil fraction and the light pyrolysis oil fraction, respectively.

The pyrolysis oil hydro-upgrading section may comprise at least one of a hydrotreating unit and a hydrocracking unit.

Any of the hydro-treating or hydro-cracking unit has the effects of olefin saturation, hydrodesulfuration, hydrodenitrification, hydrodeoxygentation, hydrodemetalation or hydrodemetalisation, hydrodearomatisation, decyclisation and the hydrocracking unit has further the effect of cracking and isomerisation to varying degrees, depending on the severity of the treatments. These effects are very suitable for the pyrolysis oil because of its high contents of oxygenates, unsaturations, metals and heteroatoms and moderate aromatic content.

Optionally, the pyrolysis oil hydro-upgrading section may comprise a hybrid fluid catalytic cracking unit in order to treat at least part of the heavy pyrolysis oil fraction for improving the overall diesel yield by shortening the average chain length of the heavy pyrolysis oil fraction.

Optionally, the mixed waste plastic recycling plant subsection for upgrading mixed waste plastic pyrolysis comprises an electrolyser for generating hydrogen. In this way, the cost of hydrogen needed to perform the hydro-treating or hydrocracking is significantly reduced, which may be critical for the economic viability of the process.

Optionally, the mixed waste plastic recycling plant subsection for upgrading mixed waste plastic pyrolysis comprises a photovoltaic solar energy generation facility. In this way, the cost of electricity needed to generate the hydrogen for the hydro-treating or hydrocracking is significantly reduced, which may be critical for the economic viability of the process. Besides, by generating electricity from renewable energy, the environmental footprint of the mixed waste plastic recycling plant subsection for upgrading mixed waste plastic pyrolysis is significantly further reduced.

DETAILED DESCRIPTION OF THE INVENTION

Figure 1:
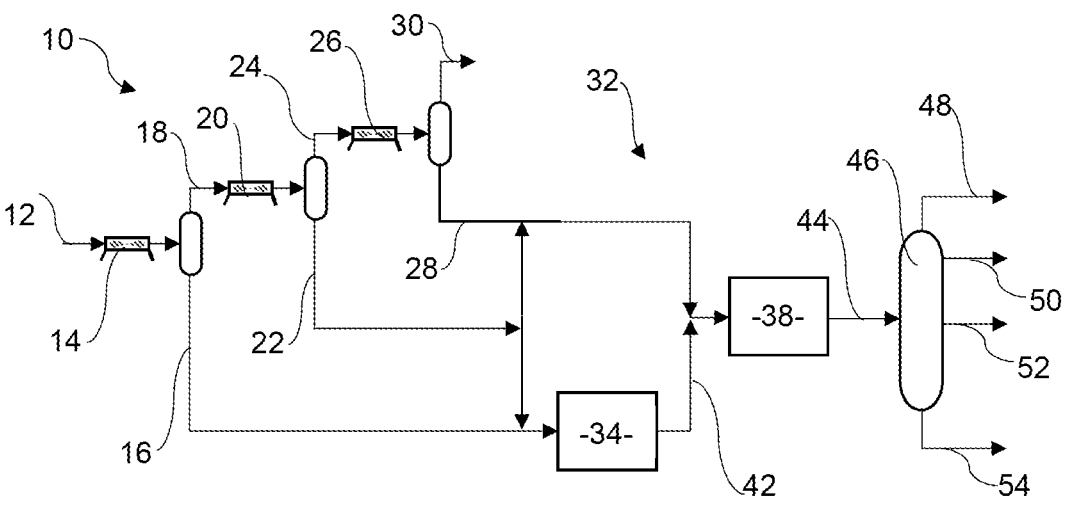
FIG. 1 is a flow diagram of a mixed waste plastic recycling plant subsection for upgrading mixed waste plastic pyrolysis oil according to a first embodiment of the invention.

Several embodiments of the invention will be described in detail below:

With reference to FIG. 1, it is shown a flow diagram of a mixed waste plastic recycling plant subsection 10 for upgrading mixed waste plastic pyrolysis according to an embodiment of the invention. The mixed waste plastic recycling plant subsection comprises a pyrolysis oil feed stream 12 coming from a mixed waste plastic pyrolysis unit.

The pyrolysis oil is fed to a first cooler 14 which is kept at a temperature between 320 to 340° C. to separate a heavy pyrolysis oil fraction 16 in liquid state. The gaseous outlet 18 of the first cooler 14 is fed to a second cooler 20 which is kept at a temperature in the range 170 to 190° C. to separate a middle pyrolysis oil fraction 22 in liquid state. The gaseous outlet 24 of the second cooler 20 is fed to a third cooler which is kept at a temperature in the range 40 to 60° C. to separate a light pyrolysis oil fraction 28 in liquid state. The gaseous outlet 30 of the third cooler 26 is used as a fuel to produce heat for the pyrolysis oil hydro-upgrading section 32.

The pyrolysis oil hydro-upgrading section 32 comprises a hybrid fluid catalytic cracking unit 34 and a hydrotreating unit 38. The heavy pyrolysis oil fraction 16 is fed to the hybrid fluid catalytic cracking unit 34, whereas the middle pyrolysis oil fraction 22 is partly fed to the hybrid fluid catalytic cracking unit 34 and partly fed to the hydrotreating unit 38. The pyrolysis oil light fraction 28 is fed to the hydrotreating unit 38 together with part of the middle pyrolysis oil fraction 22 and the hybrid fluid catalytic cracking unit outlet stream 42. The hydrotreating unit outlet stream 44 is fed to a distillation column 46 so as to obtain a flue gas stream 48 which is used as a fuel to power the pyrolysis oil hydro-upgrading section 32, an ultra-low sulphur naphtha stream 50, an ultra-low sulphur diesel stream 52 and an ultra-low sulphur fuel oil stream 54. The ultra-low sulphur naphtha stream 50, the ultra-low sulphur diesel stream 52 and the ultra-low sulphur fuel oil stream 54 can be commercialised at a premium price with little or no properties adjustment.

The mixed waste plastic recycling plant subsection 10 comprises a control system (not shown) configured for acquiring or monitoring the cetane number, density and viscosity of the diesel product stream 52; determining a proportion of the middle pyrolysis oil fraction 22 to be fed to each unit 34, 38 of the pyrolysis oil hydro-upgrading section 32, respectively, for obtaining an ultra-low sulphur diesel stream 52 with the density, cetane number and viscosity as close as possible to a product specification of density at 15° C. between 820 and 845 kg/m$^3$, viscosity at 40° C. between 2.5 and 4 mm$^2$/s, sulphur content below 10 mg/kg and a cetane number above 51, and for adjusting or controlling one or more of the temperature, pressure, residence time and hydrogen flow of each unit 34, 38 in the pyrolysis oil hydro-upgrading section 32 according to the adjusted proportions of the heavy pyrolysis oil fraction 16, the middle pyrolysis oil fraction 22 and the light pyrolysis oil fraction 28 to be fed to each unit 34, of the hydro-upgrading section 32 and the acquired diesel product properties and predetermined diesel product specifications mentioned above.

Figure 2:
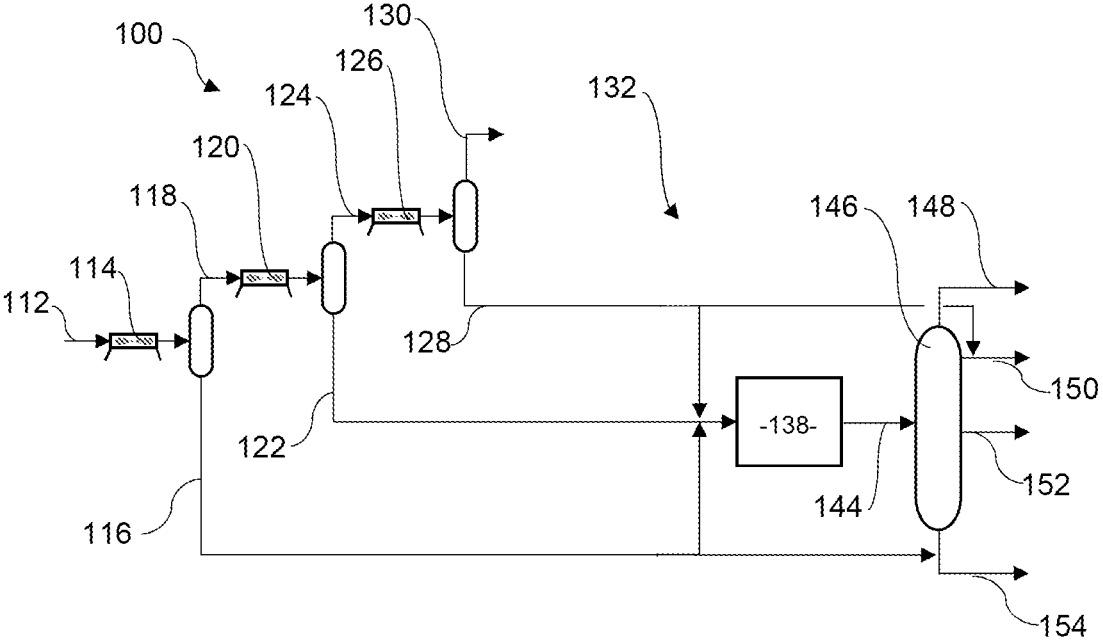
FIG. 2 is a flow diagram of a mixed waste plastic recycling plant subsection for upgrading mixed waste plastic pyrolysis oil according to a second embodiment of the invention.

With reference to FIG. 2, it is shown a flow diagram of a mixed waste plastic recycling plant subsection 100 for upgrading mixed waste plastic pyrolysis according to another embodiment of the invention. The mixed waste plastic recycling plant subsection 100 comprises a pyrolysis oil feed stream 112 coming from a mixed waste plastic pyrolysis unit (not shown).

The pyrolysis oil is fed to a first cooler 114 which is kept at a temperature between 320 to 340° C. to separate a heavy pyrolysis oil fraction 116 in liquid state. The gaseous outlet 118 of the first cooler 114 is fed to a second cooler 120 which is kept at a temperature in the range 170 to 190° C. to separate a middle pyrolysis oil fraction 122 in liquid state. The gaseous outlet 124 of the second cooler 120 is fed to a third cooler which is kept at a temperature in the range 40 to 60° C. to separate a light pyrolysis oil fraction 128 in liquid state. The gaseous outlet 130 of the third cooler 126 is used as a fuel to produce heat for the pyrolysis oil hydro-upgrading section 132.

The pyrolysis oil hydro-upgrading section 132 comprises a hydrotreating unit 138. The heavy pyrolysis oil fraction 116 is partly fed to the hydrotreating unit 138 and partly mixed with a low sulphur fuel oil product stream 154, whereas the middle pyrolysis oil fraction 122 is completely fed to the hydrotreating unit 138 and the pyrolysis oil light fraction 128 is partly fed to the hydrotreating unit 138 together with the middle pyrolysis oil fraction 122 and part of the heavy pyrolysis oil fraction 116 and partly mixed with a low-sulphur naphtha product stream 150. The hydrotreating unit outlet stream 144 is fed to a distillation column 146 so as to obtain a flue gas stream 148 which is used as a fuel to power the pyrolysis oil hydro-upgrading section 132, an low sulphur naphtha stream 150, an ultra-low sulphur diesel stream 152 and a low sulphur fuel oil stream 154. The low sulphur naphtha stream 150, the ultra-low sulphur diesel stream 152 and the low sulphur fuel oil stream 154 can be commercialised at a premium price with little or no properties adjustment.

The mixed waste plastic recycling plant subsection 100 comprises a dynamic control system (not shown) configured for acquiring the cetane number, density and viscosity of the ultra-low sulphur diesel stream 152; determining a proportion of the heavy pyrolysis oil fraction 116 and the light pyrolysis oil fraction 128 to be fed together with the middle pyrolysis oil fraction 122 to the hydrotreating unit 138 of the pyrolysis oil hydro-upgrading section 132, respectively, for obtaining an ultra-low sulphur diesel stream 152 with density, viscosity and cetane numbers as close as possible to a density at 15° C. between 820 and 845 kg/m$^3$, viscosity at 40° C. between 2.5 and 4 mm$^2$/s, sulphur content below 10 mg/kg and a cetane number above 51, and for adjusting or controlling the temperature, pressure, residence time and hydrogen flow of the hydrotreating unit 138 in the pyrolysis oil hydro-upgrading section 132 according to the adjusted proportions of the heavy pyrolysis oil fraction 116, the middle pyrolysis oil fraction 122 and the light pyrolysis oil fraction 128 to be fed to said unit 138 of the hydro-upgrading section 32, the acquired ultra-low sulphur diesel product stream 152 properties and the predetermined diesel product specifications mentioned above.

Figure 3:
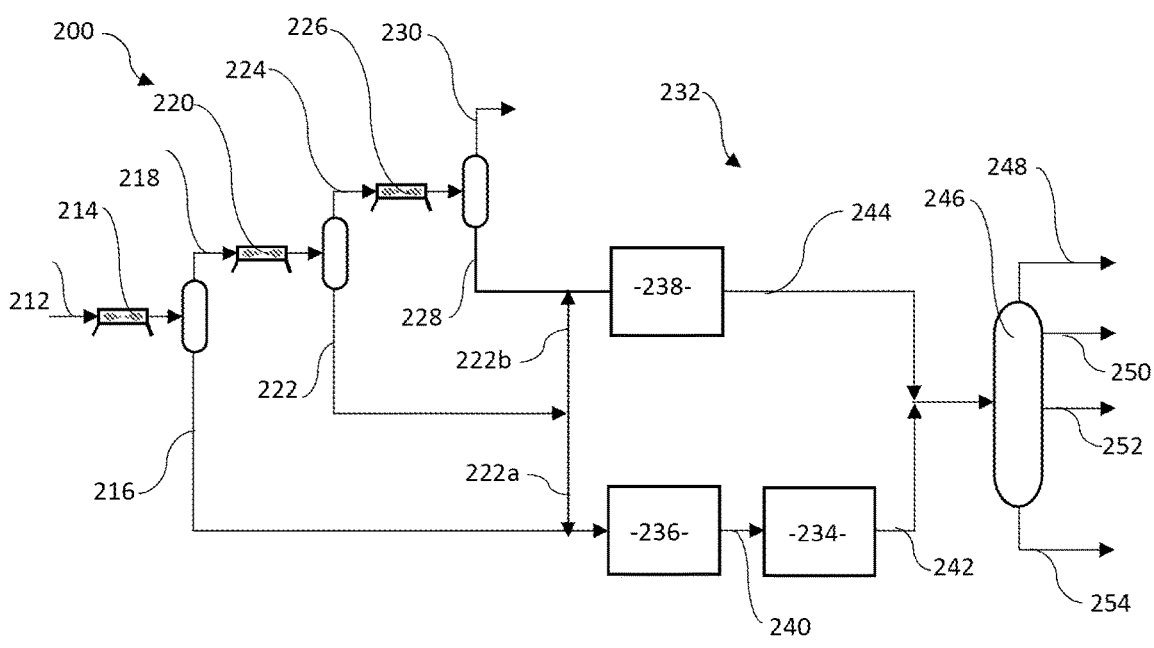
FIG. 3 is a flow diagram of a mixed waste plastic recycling plant subsection for upgrading mixed waste plastic pyrolysis oil according to a third embodiment of the invention.

With reference to FIG. 3, it is shown a flow diagram of a mixed waste plastic recycling plant subsection 200 for upgrading mixed waste plastic pyrolysis according to another embodiment of the invention. The mixed waste plastic recycling plant subsection 200 comprises a pyrolysis oil feed stream 212 coming from a mixed waste plastic pyrolysis unit (not shown).

The pyrolysis oil is fed to a first cooler 214 which is kept at a temperature between 320 to 340° C. to separate a heavy pyrolysis oil fraction 216 in liquid state. The gaseous outlet 218 of the first cooler 214 is fed to a second cooler 220 which is kept at a temperature in the range 170 to 190° C. to separate a middle pyrolysis oil fraction 222 in liquid state. The gaseous outlet 224 of the second cooler 220 is fed to a third cooler which is kept at a temperature in the range 40 to 60° C. to separate a light pyrolysis oil fraction 228 in liquid state. The gaseous outlet 230 of the third cooler 226 is used as a fuel to produce heat for the pyrolysis oil hydro-upgrading section 232.

The pyrolysis oil hydro-upgrading section 232 comprises two hydrotreating units 236, and a hydrocracking unit 234. The heavy pyrolysis oil fraction 216 is fed to a first hydrotreating unit 236, together with part of the middle pyrolysis oil fraction 222a whereas the other part of the middle pyrolysis oil fraction 222b is fed to a second hydrotreating unit 238 together with the light pyrolysis oil fraction 228. The first hydrotreating unit outlet stream 240 is fed to the hydrocracking unit 234. The hydrocracking unit outlet stream 242 is fed together with the second hydrotreating unit outlet stream 244 to a distillation column 246 so as to obtain a flue gas stream 248 which is used as a fuel to power the pyrolysis oil hydro-upgrading section 232, an ultra-low sulphur naphtha stream 250, an ultra-low sulphur diesel stream 252 and an ultra-low sulphur fuel oil stream 254. The ultra-low sulphur naphtha stream 250, the ultra-low sulphur diesel stream 252 and the ultra-low sulphur fuel oil stream 254 can be commercialised at a premium price with little or no properties adjustment.

The mixed waste plastic recycling plant subsection 200 comprises a dynamic control system (not shown) configured for acquiring or monitoring the cetane number, density and viscosity of the ultra-low sulphur diesel product stream 252; determining a proportion of the middle pyrolysis oil fraction 222 to be fed to each hydrotreating unit 236, 238 of the pyrolysis oil hydro-upgrading section 232, respectively, for obtaining an ultra-low sulphur diesel product stream 252 with density, viscosity and cetane number as close as possible to a density at 15° C. between 820 and 845 kg/m$^3$, viscosity at 40° C. between 2.5 and 4 mm$^2$/s, sulphur content below 10 mg/kg and a cetane number above 51, and for adjusting or controlling the temperature, pressure, residence time and hydrogen flow of each unit 234, 236, 238 of the pyrolysis oil hydro-upgrading section 232 according to the proportions of the heavy pyrolysis oil fraction 216, the middle pyrolysis oil fraction 222 and the light pyrolysis oil fraction 228 to be fed to each hydrotreating unit 236, 238 of the hydro-upgrading section 232, the acquired ultra-low sulphur diesel product stream 252 properties and the predetermined diesel product specification mentioned above.

Figure 4:
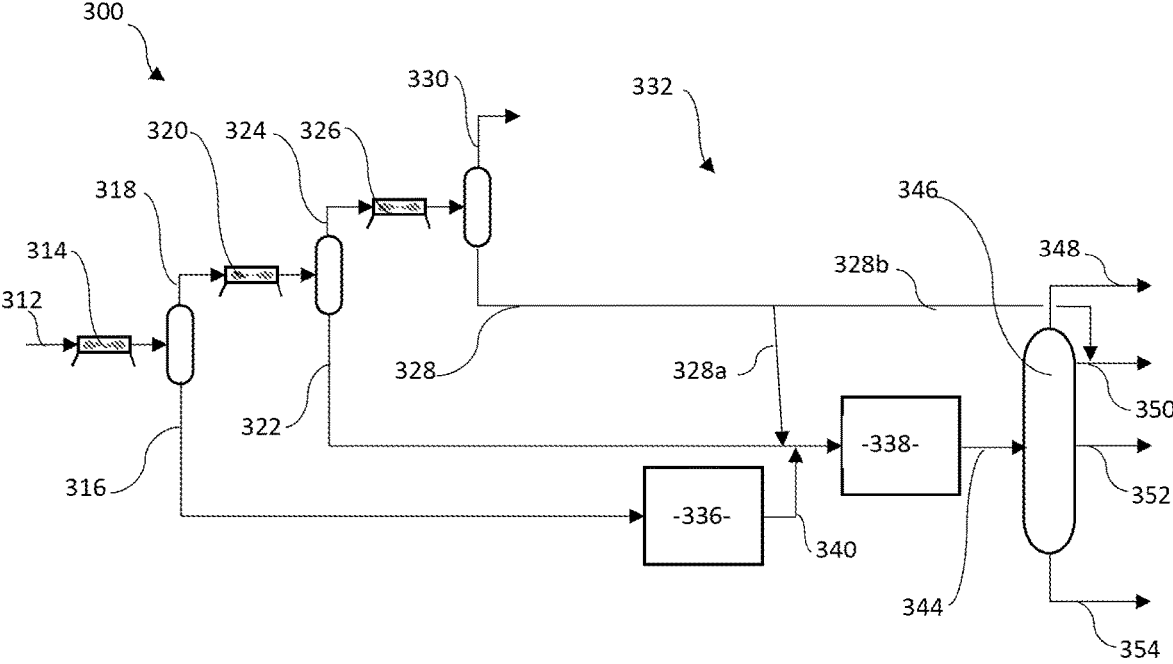
FIG. 4 is a flow diagram of a mixed waste plastic recycling plant subsection for upgrading mixed waste plastic pyrolysis oil according to a fourth embodiment of the invention.

With reference to FIG. 4, it is shown a flow diagram of a mixed waste plastic recycling plant subsection 300 for upgrading mixed waste plastic pyrolysis according to an embodiment of the invention. The mixed waste plastic recycling plant subsection 300 comprises a pyrolysis oil feed stream 312 coming from a mixed waste plastic pyrolysis unit (not shown).

The pyrolysis oil is fed to a first cooler 314 which is kept at a temperature between 320 to 340° C. to separate a heavy pyrolysis oil fraction 316 in liquid state. The gaseous outlet 318 of the first cooler 314 is fed to a second cooler 320 which is kept at a temperature in the range 170 to 190° C. to separate a middle pyrolysis oil fraction 322 in liquid state. The gaseous outlet 324 of the second cooler 320 is fed to a third cooler which is kept at a temperature in the range 40 to 60° C. to separate a light pyrolysis oil fraction 328 in liquid state. The gaseous outlet 330 of the third cooler 326 is used as a fuel to produce heat for the pyrolysis oil hydro-upgrading section.

The pyrolysis oil hydro-upgrading section 332 comprises a hybrid fluid catalytic cracking unit (HFCC) 336 and a hydrotreating unit 338. The heavy pyrolysis oil fraction is completely fed to the HFCC unit 336, whereas the middle pyrolysis oil fraction is completely fed to the hydrotreating unit 338 together with the HFCC unit outlet stream 340 and part of the light pyrolysis oil fraction 328a, whereas the remaining part of the light pyrolysis oil fraction 328b is mixed with the low sulphur naphtha stream 350. The hydrotreating unit outlet stream 344 is fed to a distillation column 346 so as to obtain a flue gas stream 348 which is used as a fuel to power the pyrolysis oil hydro-upgrading section 332, a low sulphur naphtha stream 350, an ultra-low sulphur diesel stream 352 and a low sulphur fuel oil stream 354. The low sulphur naphtha stream 350, the ultra-low sulphur diesel stream 352 and the low sulphur fuel oil stream 354 can be commercialised at a premium price with little or no properties adjustment.

The mixed waste plastic recycling plant subsection 300 comprises a dynamic control system (not shown) configured for acquiring or monitoring the cetane number, density and viscosity of the ultra-low sulphur diesel product stream 352; determining a proportion of the light pyrolysis oil fraction 328a to be fed to the hydrotreating unit 338 of the pyrolysis oil hydro-upgrading section 332 for obtaining an ultra-low sulphur diesel product stream 352 with a density, viscosity and cetane number as close as possible to a density at 15° C. between 820 and 845 kg/m³, viscosity at 40° C. between 2.5 and 4 mm²/s, sulphur content below 10 mg/kg and a cetane number above 51, and for adjusting or controlling the temperature, pressure, residence time and hydrogen flow of each unit 336, 338 of the pyrolysis oil hydro-upgrading section 332 according to the relative proportions of the heavy pyrolysis oil fraction 316, the middle pyrolysis oil fraction 322 and the light pyrolysis oil fraction 328 to be fed to each unit 336, 338 of the hydro-upgrading section 332, the acquired ultra-low sulphur diesel stream 252 properties and the predetermined diesel product specification mentioned above.

The invention claimed is:

1. A method of upgrading mixed waste plastic pyrolysis oil comprising the steps of:

providing a pyrolysis oil stream derived from mixed waste plastic pyrolysis;

subjecting the pyrolysis oil stream to a three-step fractional condensation to obtain a heavy pyrolysis oil fraction, a middle pyrolysis oil fraction and a light pyrolysis oil fraction;

acquiring one or more properties of a diesel product stream;

determining and adjusting a proportion of the heavy pyrolysis oil fraction, the middle pyrolysis oil fraction and/or the light pyrolysis oil fraction to be fed to each unit of a pyrolysis oil hydro-upgrading section for obtaining a diesel product stream with one or more properties as close as possible to a predetermined diesel product specification, feeding the heavy pyrolysis oil fraction, the middle pyrolysis oil fraction and/or the light pyrolysis oil fraction in the adjusted proportion to each unit of a pyrolysis oil hydro-upgrading section to perform a hydro-upgrading operation;

adjusting one or more control parameters of each unit of the pyrolysis oil hydro-upgrading section according to:

the adjusted proportions of the heavy pyrolysis oil fraction, the middle pyrolysis oil fraction and/or the light pyrolysis oil fraction to be fed to each unit of the hydro-upgrading section, the acquired one or more properties of the diesel product stream and the predetermined diesel product specification; and separating a hydro-upgrading section outlet stream to obtain a diesel product stream with one or more properties as close as possible to the predetermined diesel product specification.

2. A method according to claim 1 wherein the three-step fractional condensation of the pyrolysis oil stream comprises a first condensation at a temperature between 320 to 340° C. to separate the heavy pyrolysis oil fraction.

3. A method according to claim 1 wherein the three-step fractional condensation of the pyrolysis oil stream may comprise a second condensation at a temperature between 170 to 190° C. to separate the middle pyrolysis oil fraction.

4. A method according to claim 1 wherein the three-step fractional condensation of the pyrolysis oil stream may comprise a third condensation at a temperature between 40 to 60° C. to separate the light pyrolysis oil fraction and a gas fraction.

5. A method according to claim 4 wherein the gas fraction remaining after the third condensation is used as a fuel for the hydro-upgrading section and/or for the separation.

6. A method according to claim 1 wherein acquiring one or more properties of the diesel product stream comprises in-line or off-line data acquisition of one or more properties selected from the group consisting of pressure, temperature, flow, PIONA analysis values, density, viscosity, corrosiveness, Bromine number, pour point, cloud point, sulphur content, cetane number and SARA numbers.

7. A method according to claim 1 comprising acquiring one or more properties of the heavy pyrolysis oil fraction, the middle pyrolysis oil fraction and/or the light pyrolysis oil fraction.

8. A method according to claim 7 wherein acquiring one or more properties of the heavy pyrolysis oil fraction, the middle pyrolysis oil fraction and/or the light pyrolysis oil fraction, respectively, comprises in-line or off-line data acquisition of one or more properties selected from the group consisting of pressure, temperature, flow, PIONA analysis values, density, viscosity, corrosiveness, Bromine number, pour point, cloud point, sulphur content and SARA numbers of each pyrolysis oil fraction.

9. A method according to claim 7 wherein adjusting one or more control parameters of each unit of the pyrolysis oil hydro-upgrading section is done also according to the acquired one or more properties of the heavy pyrolysis oil fraction, the middle pyrolysis oil fraction and/or the light pyrolysis oil fraction.

10. A method according to claim 7 wherein the step of determining an adjusted proportion of the heavy pyrolysis oil fraction, the middle pyrolysis oil fraction and/or the light pyrolysis oil fraction to be fed to each unit of a pyrolysis oil hydro-upgrading section for obtaining a diesel product stream with one or more properties as close as possible to a predetermined diesel product specification takes into account the acquired one or more properties of the heavy pyrolysis oil fraction, the middle pyrolysis oil fraction and/or the light pyrolysis oil fraction.

11. A method according to claim 1 wherein the pyrolysis oil hydro-upgrading operation comprises hydrocracking and/or hydrotreating the heavy pyrolysis oil fraction, the middle pyrolysis oil fraction and/or the light pyrolysis oil fraction in different proportions and combinations thereof.

12. A method according to claim 1 wherein determining an adjusted proportion of the heavy pyrolysis oil fraction, the middle pyrolysis oil fraction and/or the light pyrolysis oil fraction to be fed to a pyrolysis oil hydro-upgrading section for obtaining a diesel product stream with one or more properties as close as possible to a predetermined product specification, and adjusting one or more control parameters of the pyrolysis oil hydro-upgrading section according to the adjusted proportion of the heavy pyrolysis oil fraction, the middle pyrolysis oil fraction and the light pyrolysis oil fraction and the predetermined product specification is carried out by a dynamic control system comprising a programmable processing unit.

13. A method according to claim 12 wherein determining an adjusted proportion of the heavy pyrolysis oil fraction, the middle pyrolysis oil fraction and/or the light pyrolysis oil fraction to be fed to a pyrolysis oil hydro-upgrading section for obtaining a diesel product stream with one or more properties as close as possible to a predetermined product specification, and adjusting one or more control parameters of the pyrolysis oil hydro-upgrading section according to the adjusted proportion of the heavy pyrolysis oil fraction, the middle pyrolysis oil fraction and the light pyrolysis oil fraction and the predetermined product specification is done taking into account the acquired one or more properties of the heavy pyrolysis oil fraction, the middle pyrolysis oil fraction and/or the light pyrolysis oil fraction.

14. A method according to claim 1 wherein the pyrolysis oil hydro-upgrading operation comprises in-situ hydrogen generation by water electrolysis powered by solar energy.

15. A method according to claim 1 wherein separating a hydro-upgrading section outlet stream to obtain a diesel product stream with one or more properties as close as possible to a predetermined product specification comprises fractional distillation of one or more hydro-upgrading section outlet streams.

\* \* \* \* \*